W. L. WRIGHT.
MACHINE FOR PARAFFINING DISKS OR THE LIKE.
APPLICATION FILED APR. 1, 1908.

930,911.

Patented Aug. 10, 1909.
6 SHEETS—SHEET 2.

Witnesses
W. A. Williams
E. R. Peck

Inventor
Wilbur L. Wright
by Hubert F. Peck
Attorney

W. L. WRIGHT.
MACHINE FOR PARAFFINING DISKS OR THE LIKE.
APPLICATION FILED APR. 1, 1908.

930,911.

Patented Aug. 10, 1909.

Witnesses
W. A. Williams
E. R. Pick

Inventor
Wilbur L. Wright
Hubert Peck
Attorney

W. L. WRIGHT.
MACHINE FOR PARAFFINING DISKS OR THE LIKE.
APPLICATION FILED APR. 1, 1908.

930,911.

Patented Aug. 10, 1909.
6 SHEETS—SHEET 5.

Witnesses
W. A. Williams
E. R. Peck

Inventor
By Wilbur L. Wright
Hubert Eleck Attorney

W. L. WRIGHT.
MACHINE FOR PARAFFINING DISKS OR THE LIKE.
APPLICATION FILED APR. 1, 1908.
930,911.
Patented Aug. 10, 1909.
6 SHEETS—SHEET 6.
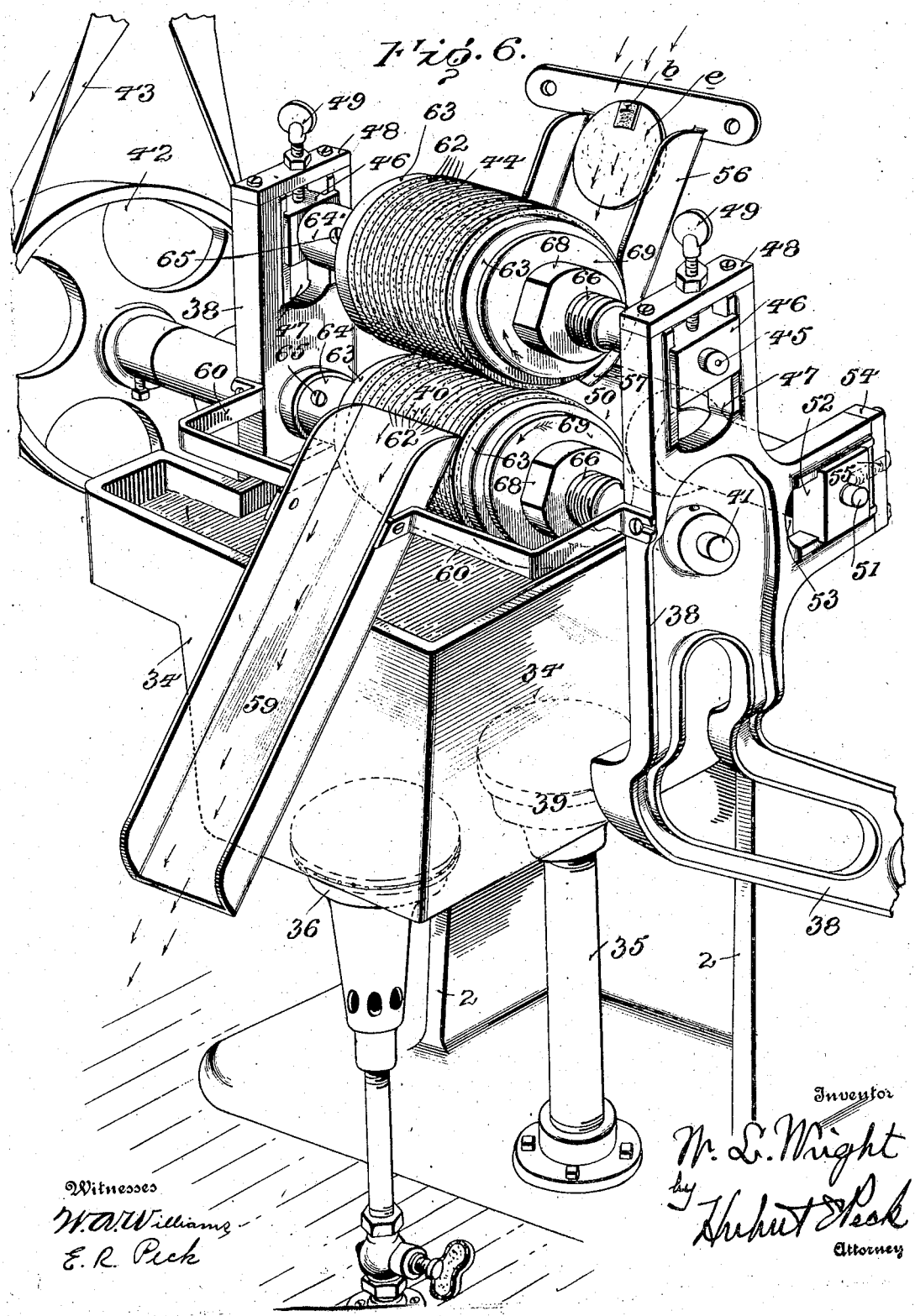

UNITED STATES PATENT OFFICE.

WILBUR L. WRIGHT, OF WASHINGTON, DISTRICT OF COLUMBIA, ASSIGNOR TO THE AMERICAN DAIRY SUPPLY COMPANY, OF AUGUSTA, MAINE, A CORPORATION OF MAINE.

MACHINE FOR PARAFFINING DISKS OR THE LIKE.

No. 930,911.  Specification of Letters Patent.  Patented Aug. 10, 190

Application filed April 1, 1908. Serial No. 424,598.

*To all whom it may concern:*

Be it known that I, WILBUR L. WRIGHT, a citizen of the United States, residing at Washington, District of Columbia, have invented certain new and useful Improvements in Machines for Paraffining Disks or the Like; and I do hereby declare the following to be a full, clear, and exact description of the invention, such as will enable others skilled in the art to which it appertains to make and use the same.

This invention relates to certain improvements in machinery for producing paraffined receptacle closing disks or the like; and the objects and nature of my invention will be readily understood by those skilled in the art in the light of the following explanation of the accompanying drawings illustrating what I now consider my preferred embodiment from among other constructions and arrangements within the spirit and scope of my invention.

My invention consists in certain novel features in construction or in combinations and arrangements of parts as more fully and particularly set forth hereinafter.

Figure 1:
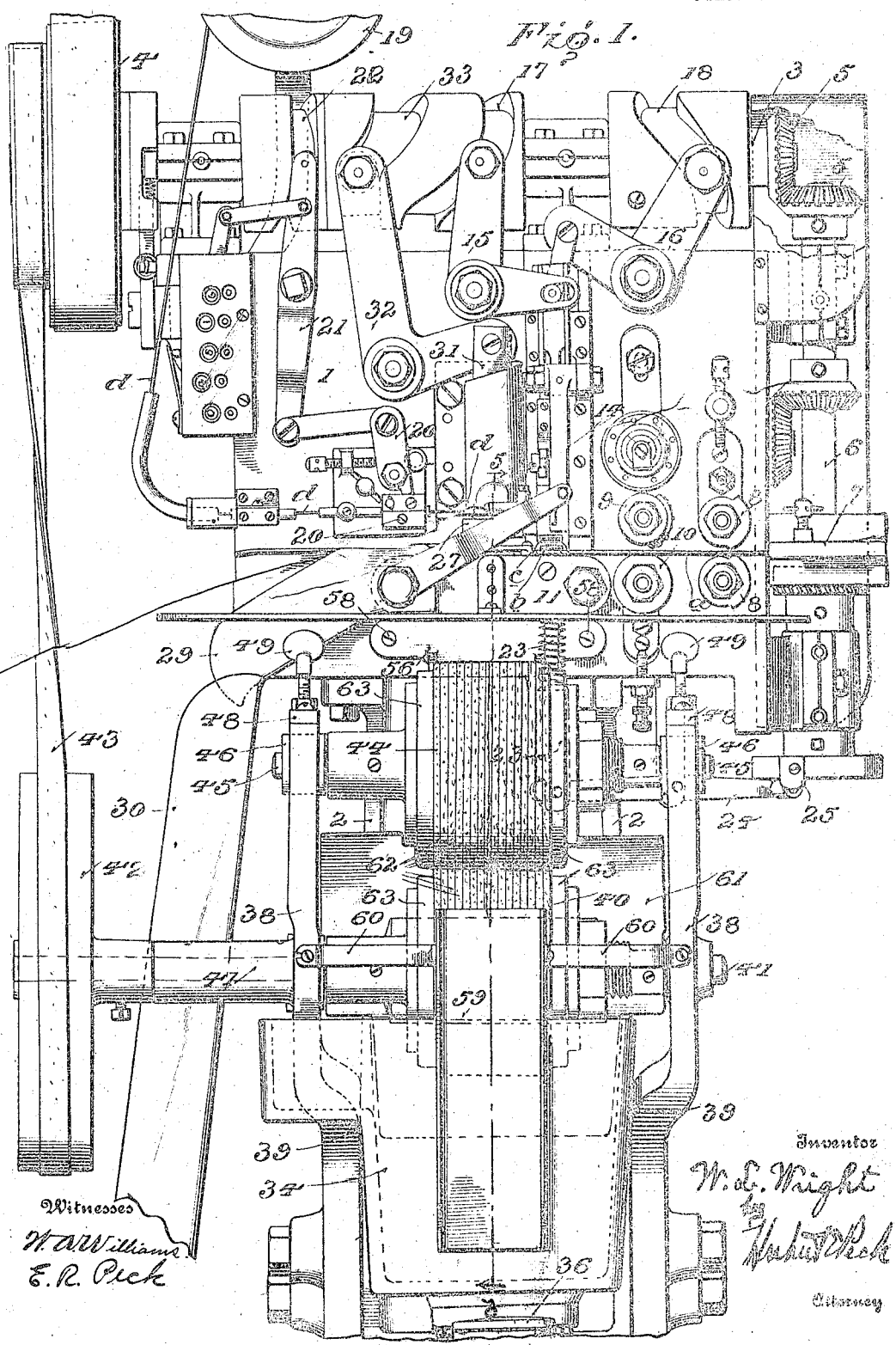
Figure 2:
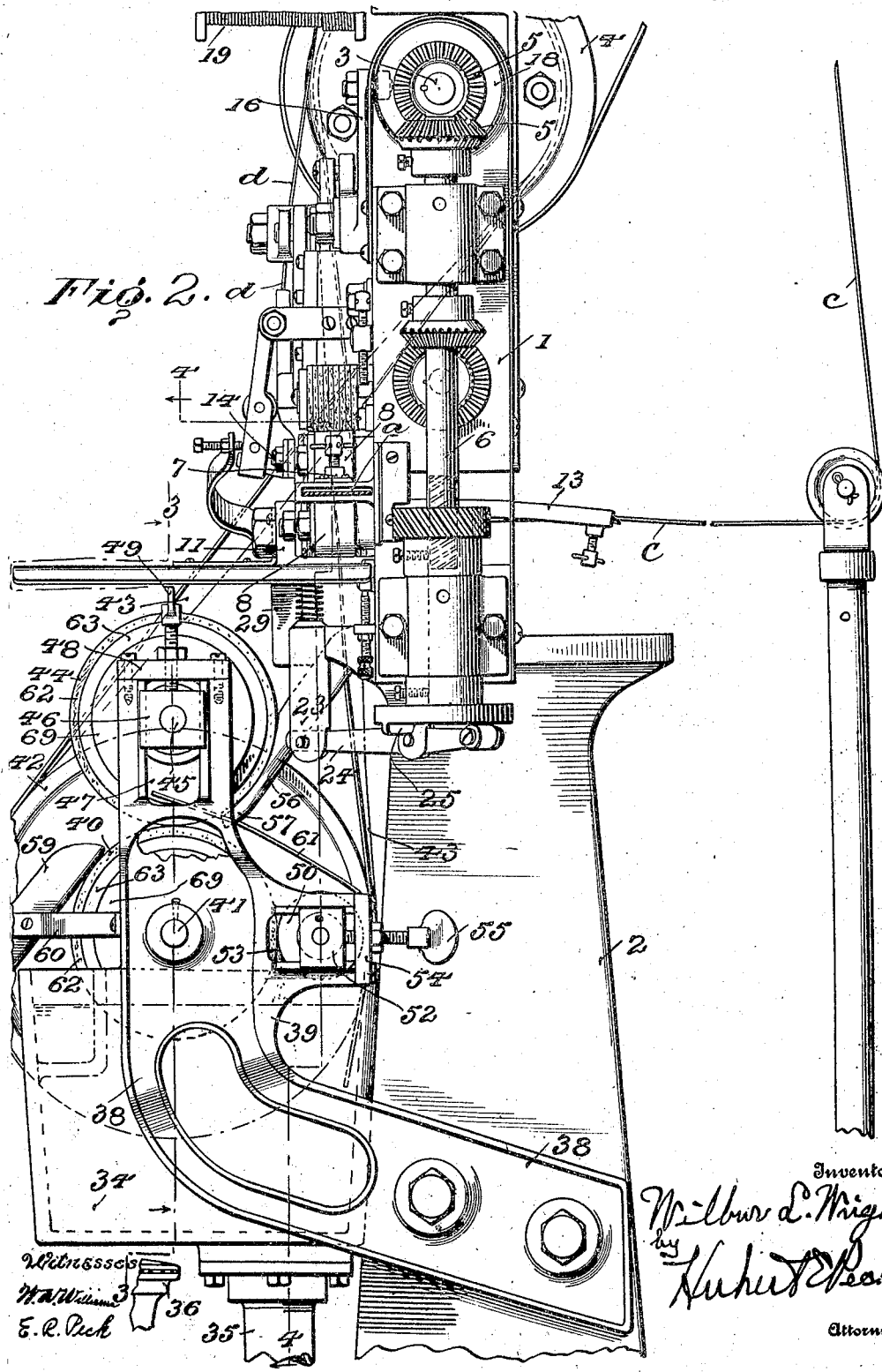
Figure 3:
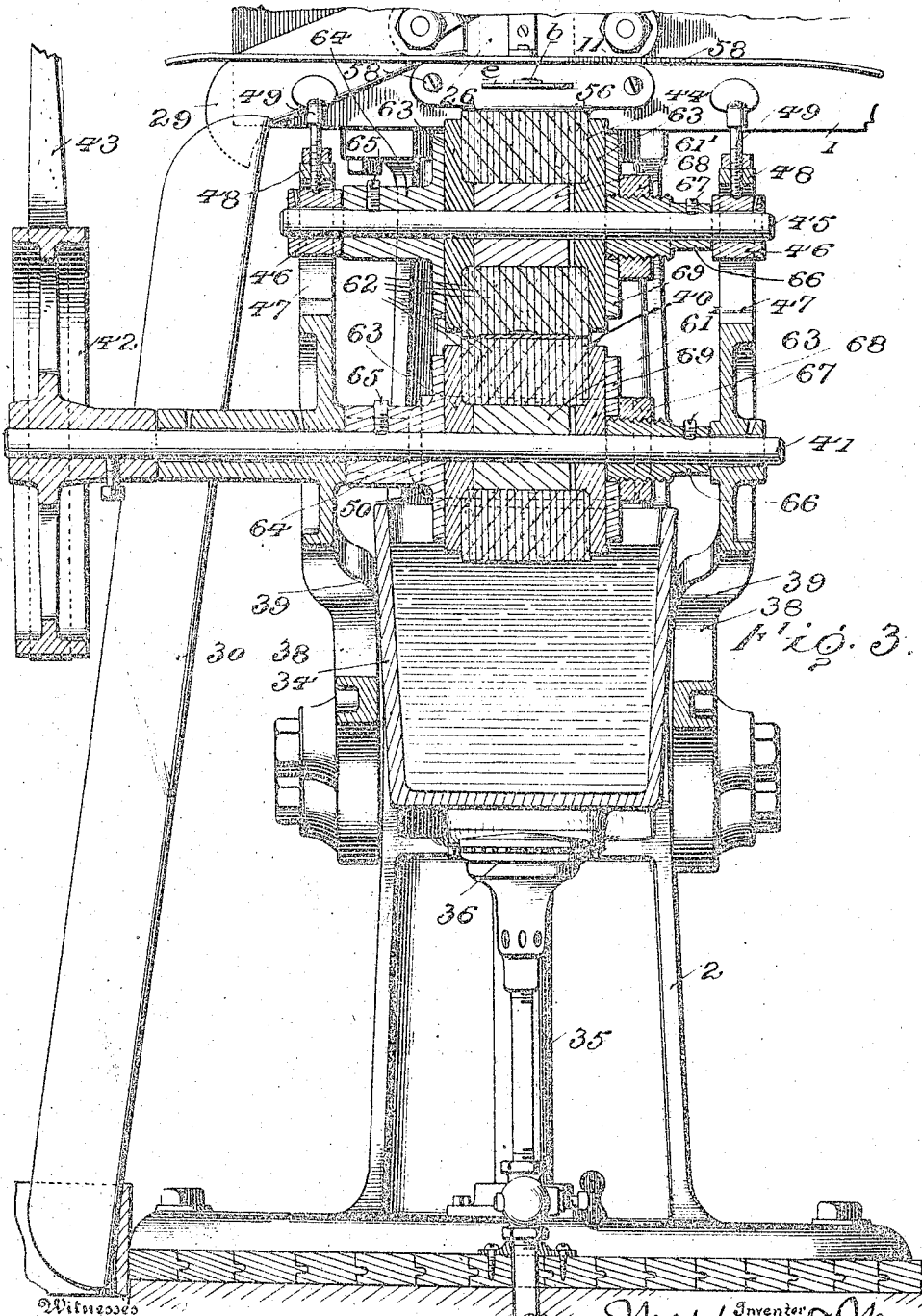
Figure 4:
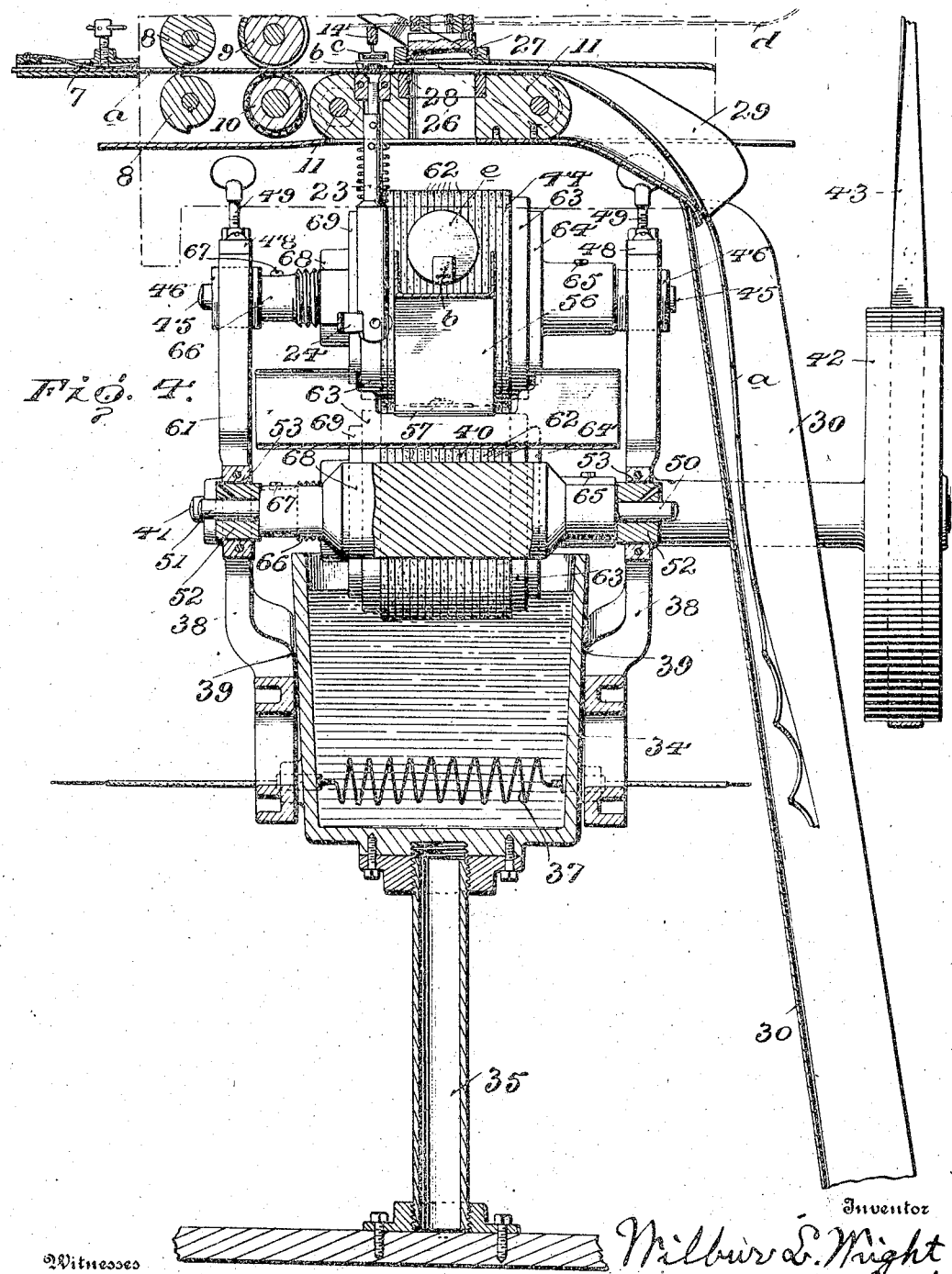
Figure 5:
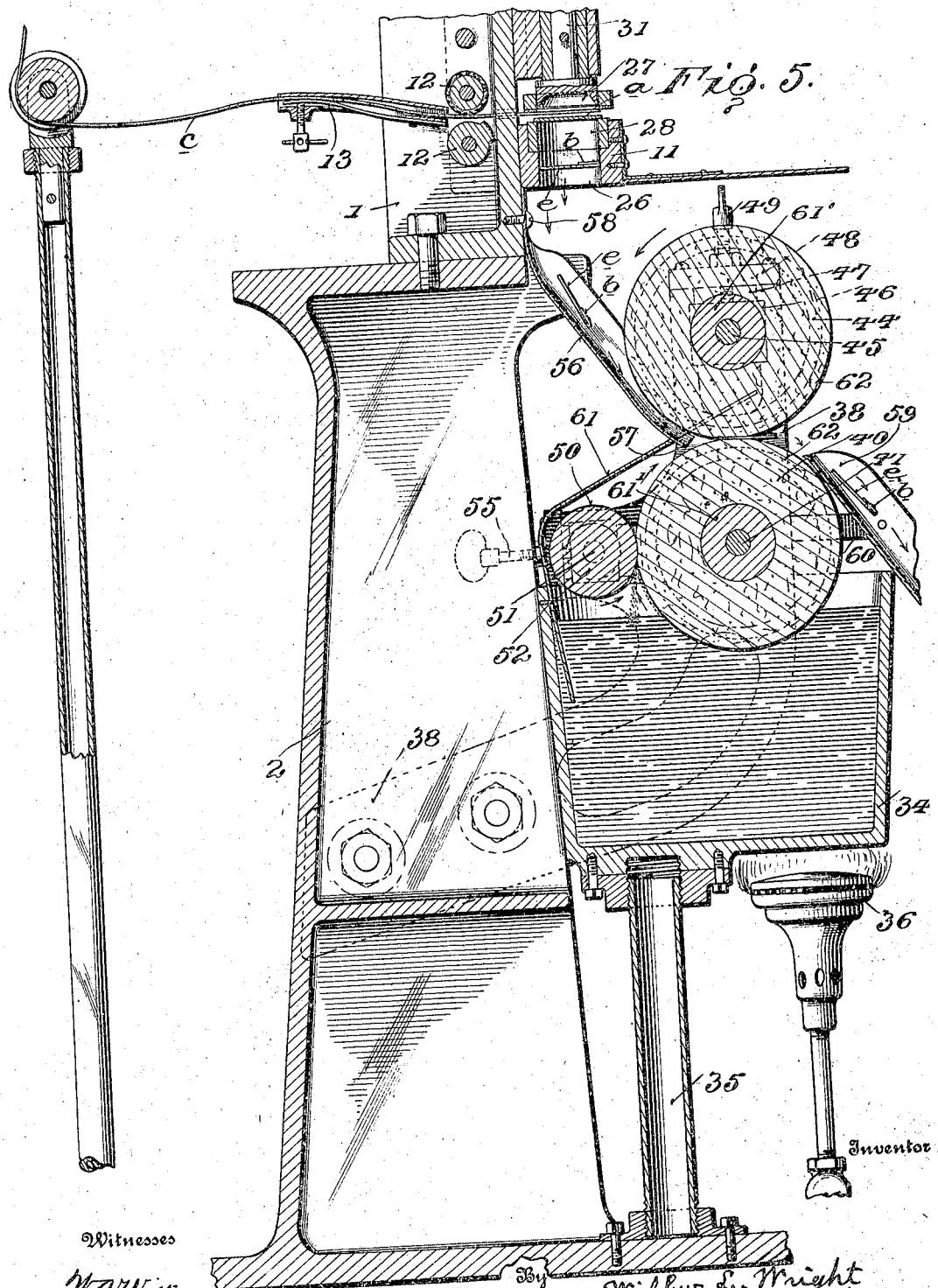

Referring to the accompanying drawings:—Figure 1, is a front elevation of a paraffined closing disk machine embodying my invention. Fig. 2, is a side or end elevation thereof. Fig. 3, is a vertical section taken on the line 3—3, Fig. 2. Fig. 4, is a vertical section taken on the line 4—4, Fig. 2. Fig. 5, is a vertical section taken on the line 5—5, Fig. 1. Fig. 6, is a detail perspective of the paraffining device.

In the drawings, 1, is a vertically disposed bed, frame, or plate secured to and rising from a base or pedestal 2. A horizontally disposed power or driving shaft 3, is arranged above and usually parallel with the upper longitudinal edge of said bed, and is carried by suitable journal boxes fixed to said bed. This shaft can be suitably driven, as through pulley 4. At one end, drive shaft 3, is through the medium of bevel gearing 5, connected to rotate vertical shaft 6, arranged at a vertical edge of bed 1, and carried by suitable journal boxes fixed to said bed.

The ribbon or band a, of paper or pulp stock from which the closing or cover disks or caps are cut, punched or stamped out, can be fed into the machine from a suitable reel or roll. The band of stock a, is usually passed into the machine through a suitable tension device 7, from which the stock passes horizontally along the front vertical face of the bed 1, being propelled step by step by the oppositely arranged constantly rotating coöperating feed rolls 8, driven through suitable gearing and driving connections from shaft 6. The feed rolls have mutilated gripping or raised feeding surfaces for the purpose of periodically gripping the stock and feeding the same a predetermined distance at each feeding movement.

A printing mechanism can be provided to receive and imprint the stock after it has passed between the feed rolls. I show a printing roll 9, and coöperating impression roll 10, between which rolls the stock passes. These printing rolls are usually constantly rotated through the medium of suitable driving gears and connections from shaft 6, and the printing roll is shown provided with a raised printing surface which periodically moves into printing relation with respect to the stock. The arrangement usually being such that on each feeding stroke of the stock a portion thereof is printed, the stock remaining at rest after each feeding and printing stroke, each feeding stroke being approximately equal to the width or diameter of a disk, each imprinted portion of the stock being by a later step cut out to form a disk. The feed and printing rollers project horizontally from the front vertical face of the bed, being suitably mounted and carried thereby.

From the printing mechanism, the stock passes horizontally along the longitudinal top face of a rigid bed, block or wall 11, fixed to the lower portion of the vertical front face of the bed 1, and projecting horizontally and outwardly therefrom. The stock passes from the printing device, to the mechanism for cutting off and stapling short paper or like material, handle or pull tabs b, at uniformly spaced intervals on the upper face of the stock as it passes along the bed 11, each tab being secured to the stock while the same is held at rest in the intervals between the feeding or forward movements thereof. The tabs $b$, are formed by lengths cut from a ribbon or band of tab stock $c$, usually fed from a roll or spool, not shown, from the rear of the bed, forwardly through a suitable tension device 13, and then through an opening in bed 1, to and transversely across the flat horizontal top face of the disk stock and above block or bed 11. The tab stock is fed periodically or step by step by constantly rotating coöperating feed rolls 12, usually similar in construction to feed rolls 8, and driven through the medium of suitable gearing and connections from shaft 6.

The tab stock is fed across the disk stock in the field of operation of a suitable staple forming, driving and clenching mechanism arranged at the front face of the bed 1. The staple forming and driving means are indicated generally by the reference figures 14, and comprise vertically reciprocating slides operated in the desired sequence by the vertically rocking elbow levers 15, 16, fulcrumed to and arranged at front face of the bed and actuated by suitable cams 17, 18 on the drive shaft 3. Wire $d$ from a spool 19, is fed step by step and in the proper sequence along the front face of the bed and into the staple forming and driving mechanism, by a reciprocating wire feeder 20, actuated by lever 21, driven by cam 22, on the drive shaft 3.

The staple forming and driving mechanism cuts off the proper length of wire, forms the staple, cuts off a tab $b$, from stock $c$, and drives the staple down through the tab and disk stock, and thereupon a plunger or staple clencher 23, moves up through block 11, and clenches the staple at the bottom face of the disk stock. The clencher 23, is operated in proper sequence by lever 24, rocked by a cam 25, fixed to shaft 6.

After a tab has been stapled to the disk stock, said stock is moved forward a stroke to bring the portion of said stock having the tab directly beneath vertically reciprocating disk cutter, die or punch 27, and over coöperating ring die or annulus 28, set in block 11, and forming the upper surrounding wall of disk discharge passage 26, opening vertically through block 11. The die 27, cuts the disks $e$, from the disk stock, each having a tab and usually being imprinted, and said disks are discharged vertically through discharge 26, to the paraffining mechanism. The disk stock waste passes off beyond block 11, and over discharge guide 29, and drops into depending discharge chute 30. The disk cutting die 27, is carried by a suitably guided reciprocating plunger 31, arranged vertically at the front face of bed 1, and operated in proper sequence by elbow lever 32, actuated by cam 33, on drive shaft 3.

The paraffining mechanism comprises a usually open top paraffin pot 34, of a suitable form and construction and preferably supported and carried by a leg or standard 35, at its lower end rigidly secured to the floor or other base or support and at its upper end secured and affixed to the bottom of the pot.

Any suitable means can be provided for maintaining the desired temperature in the pot for melting the paraffin or for keeping the paraffin in the desired liquid state or condition. A gas burner 36, located below the pot, can be employed for this purpose, or if so desired, an electric heating or resistance coil 37, or the like, can be arranged within the pot and provided with suitable electric connections at the exterior of the pot. A pair of usually parallel strong metal arms or brackets 38, are arranged at opposite sides of the exterior of said pot, and if so desired can be formed with bearing or abutting faces 39, to engage the side walls of the pot and thereby brace and steady the pot and properly center the same between the arms, although in the example shown, the arms are not secured to the pot. The laterally or rearwardly extending lower ends of said arms 38, are rigidly, yet preferably removably, bolted or otherwise secured to the main pedestal or standard 2, of the machine. The front ends of the arms extend vertically beyond the horizontal plane of the top of the pot, to receive the paraffin applying rollers.

The lower or main paraffin roller 40, is arranged horizontally and transversely across the open top of the pot so that its lower portion will constantly dip the necessary distance into the liquid paraffin in the pot. The shaft 41, of said roller is arranged above the top edges of the pot and is carried by and mounted to revolve in fixed bearings or boxes in the brackets 38. One end of said shaft is shown extended through an arm 38, and provided with an exterior driving pulley 42, driven by a belt 43, from the main drive shaft 3, of the machine. The belt 43, or any other suitable driving means that may be employed, is, in the example illustrated, arranged to rotate the paraffin roller 40, in such direction that its upper exposed surface or portion will move forwardly, that is from the rear toward the front. Paraffin idler roller 44, is arranged immediately above, parallel with and is held to and rotated by frictional contact with roller 40, and is carried by shaft 45, mounted in and carried by journal boxes 46.

The boxes 46, are vertically movable in vertical guide-ways or slots 47 in the extended upper ends of brackets 38. These slots open through the upper ends of said brackets so that the boxes with the shaft 45 and roller 44, can be removed, by removing the cross bars 48, normally closing the upper ends of said slots and removably secured down on the top edges of the brackets by screws or other suitable means.

The roller 44 is held down on the roller 40, under the desired pressure by any suitable means, such for instance, as by vertical set or thumb screws 49, vertically adjustable through and carried by cross bars 48, and abutting against the top edges or faces of boxes 46. The pressure of the upper against the lower paraffining roller can hence be kept up to the desired point as the surfaces of the rollers wear or can be varied according to the nature of the paraffin employed or thickness or quality of the disks being produced.

An idler stripping roller 50, is provided for the paraffin roller 40, and is arranged parallel therewith and in engagement with the rear upwardly moving paraffin elevating surface thereof. This stripping roller is located immediately over the rear portion of the open top of the pot between the rear wall thereof and the roller 40, and is carried by and fixed to shaft 51, mounted in and carried by journal boxes 52, arranged in horizontal slots or guides 53, in rearward extensions of the brackets 38. The rear otherwise open ends of the slots are closed by cross bars 54, removably secured to said extensions and carrying horizontally adjustable set or thumb screws 55, abutting against the rear ends of boxes 52, and by which the pressure of the stripping roller against the roller 40, can be varied and controlled. The stripping roller and its shaft and boxes can be removed by removing cross bars 54.

The paraffining rollers 40, 44, are arranged below the disk discharge opening 26, and in a vertical plane in front of the vertical plane of said opening, and a downwardly and forwardly inclined chute or guide 56, is arranged to receive the disks dropped from opening 26, and deliver them horizontally onto roller 40, or between rollers 40, 44. This chute 56, can be formed of sheet metal with longitudinal side flanges, the lower discharge edge 57 of the chute curving forwardly and terminating opposite and just in rear of the bite between the rollers 40, 44, while the upper end of the plate can be secured at 58, to the front face of the lower part of bed 1, below the block 11, so that said chute is arranged to the rear of upper roller 44. The disks drop one by one on the inclined upper face of the chute and slide flat face down on said chute with the tab at the top face. The chute is arranged to prevent rolling of the disks and to deliver them one at a time and horizontally into the bite of the constantly rotating rollers. The disks are spaced apart as they pass forwardly between the rollers, and are discharged thereby at the front of the rollers onto forwardly and downwardly inclined flanged discharge chute 59, from the lower end of which the paraffined disks can drop into a basket or other suitable receptacle for packing or shipment. The discharge chute 59, can be supported by suitable arms such as 60, secured thereto and to the brackets 38. The transverse upper edge of the discharge chute 59, is arranged longitudinally of the forwardly and downwardly moving upper portion of roller 40, to receive or if need be remove the disks therefrom, and prevent the same being carried down or dropping into the pot.

If so desired a shield or guard 61, secured to the rear wall of the pot, can be arranged over the stripping roller and the top of the pot in rear of roller 40, to prevent foreign material from the machine or elsewhere dropping into the paraffin, and also to catch liquid paraffin which might possibly be thrown upwardly from the stripping roller.

The paraffin conveying and applying surfaces of the rollers 40 and 44, are formed of suitable compressible and usually to a certain extent absorbent material. The working surfaces of said rollers are subjected to comparatively hard service at considerable speed and hence must be durable and capable of convenient renewal.

In the specific example illustrated, the rollers 40, 44, are similar in construction, and each comprising a central sleeve or core 61', of wood if so desired, slipped onto the roller shaft which passes loosely and concentrically therethrough. On this core 61', are slipped a multiplicity of parallel similar disks 62, arranged face to face and tightly compressed together. These disks can be composed of any suitable woven, or fibrous material or other fabric, or the like, such as heavy canvas or ducking. The fabric disks are arranged on the core between opposite end heads 63, arranged at the ends of the core and projecting beyond the same so that the disks can be compressed between the heads which however are less in diameter than the disks. These heads are arranged loosely and concentrically on the roller shaft. One end head 63, abuts against the flanged inner end of a sleeve 64, arranged centrally on the shaft at an end of the roller and secured to the shaft in a suitable manner as by set screw 65. At the opposite end of the roller a sleeve 66, is removably arranged on the shaft and secured thereto by suitable means, such as set screw 67. This sleeve is longitudinally and externally screw threaded to receive exterior adjusting nut 68, to force washer 69, against the adjacent head 63, and thereby tightly compress the fabric disks and whereby said disks can be maintained under the desired compression. The cylindrical surface formed by the outer edges of the fabric disks constitutes an exceedingly durable and effective paraffin conveying and applying surface of the desired compressibility. The roller shafts can be removed with their rollers when necessary, and if the fabric surfaces have become worn down approximately to the heads 63, the edges of said heads can be turned down if so desired, or the fabric disks can be removed and new disks applied. The roller 40, can be removed by releasing either or both brackets 38, from the pedestal of the machine and removing the drive pulley 42.

In view of the compressible nature of the working surfaces of rollers 40, 44, these rollers can be held together under considerable pressure to insure proper driving of the roller 44, by the frictional engagement thereof with roller 40, and to so compress the surfaces of the rollers at the bite as to insure delivery of ample paraffin from roller 40, to roller 44, to thoroughly saturate the working surface of roller 44, with the paraffin and keep the same at the necessary temperature to maintain the fluidity thereof. The working surfaces of the rollers are also compressed at the bite to insure thorough coating of both the top and bottom faces as well as the edges of each disk with paraffin, as said working faces being so compressed squeeze out or exude an ample supply of paraffin at the bite of the rollers as each disk or cap passes therethrough. The action of the rollers is such however, that while the exterior surfaces of the disks or caps are thoroughly coated, yet such an excess of paraffin is not applied as would necessitate drying of the caps or disks after being discharged from the rolls. In fact, the coating of paraffin on each disk is dry by the time the disk drops from discharge chute 59.

As there is an interval between the caps or disks as they enter the paraffin rolls, the roller roll 40, keeps the upper roll 44, amply supplied with paraffin for coating the top surfaces of the caps or disks, on which top surfaces the handle tabs are located. These tabs lie flat on the top surfaces of the disks and do not interfere with the coating operation, although the machine is as well adapted to making and coating disks or caps not provided with the tabs.

The working surface of the stripping roller can be composed of any suitable material, although I can employ the surface made up of fabric disks as hereinbefore described.

The stripping roller is held with sufficient pressure against the upwardly moving rear face of the roller 40 to be rotated thereby and to compress the same to the necessary extent to strip surplus paraffin therefrom and thereby regulate the quantity of paraffin carried up by said roller 40.

Advantages are attained by arranging the disk or cap producing mechanisms on the front face of a vertical bed, and in providing the chutes 56, and 59, open at the front, and the paraffin rollers exposed at the front of the machine, as the operator located in front of the machine can, thereby at all times easily observe and inspect the working of the machines and parts, and the travel of the disks or caps, and has quick and easy access to all parts and to the caps while in transit.

The paraffin is applied to the paper material disks or caps to render them impervious, or approximately so, and it is obvious that by using the term paraffin I do not wish to limit my invention to use in connection with such material for it might be found that other coating material would serve the purpose.

Usually the lower roll 40, wears more rapidly than the upper roll 44, and as said lower roll turns on a fixed axis, the horizontal plane of the bite of the rolls lowers as the rolls wear, hence if so desired means can be provided to maintain the relative positions of the chute 56, and the lower roll. For instance, the brackets 38, might be adjusted vertically or else the chute 56, can be adjusted vertically to maintain its lower edge in the desired position with respect to the lower roll 40. Also, if desired, the brackets 38, can be secured to the machine pedestal or adjusted so as to tilt the rolls 40, 44, forwardly from a vertical plane. That is so that the axis of the upper roll will be in advance of a vertical plane through the axis of the lower roll, whereby the chute 56, need not be bent to deliver the disks horizontally into the bite of the rolls, but can deliver the disks forwardly and downwardly at an angle.

It is evident that various modifications and changes might be resorted to, that elements or groups of elements might be omitted or elements or groups of elements added, without departing from the spirit and scope of my invention, and hence I do not wish to limit myself to the exact constructions shown.

What I claim is:—

1. A machine for making paper material closing caps or disks having flat sheet material handles, comprising a vertically arranged bed, having a horizontal die block projecting forwardly from the front face of said bed and formed with a vertical downwardly opening disk discharge, means at said front face of the said bed to feed a ribbon of disk stock horizontally across said die block, means for clipping flat sheet material handles thereto, a punch at the front face of said bed for coöperating with said block in cutting disks from said stock, and paraffining mechanism arranged below and receiving the disks from said discharge, substantially as described.

2. In combination, in a machine for making and paraffining closing disks or caps having handles, a vertically disposed bed, means for feeding a ribbon of disk stock along the front of said bed and with its flat faces horizontal, a handle stock feed, means at the front of said bed for securing flat handles at intervals on the top face of said stock, vertically movable means for cutting disks having handles from said stock, and paraffining means receiving said disks.

3. Means for forming closing disks or caps, in combination with mechanism for coating said disks with paraffin comprising a pair of coöperating horizontal rolls arranged one over the other and pressed together to distribute paraffin one on the other, one of said rolls being an idler driven by frictional engagement with the other roll, means for supplying paraffin to one of said rolls, and a chute receiving the caps from said cap forming means and delivering the same horizontally into the bite of said rolls, substantially as described.

4. A machine for the manufacture of flat closing disks or caps having flat handles tabs secured thereto, and arranged flat thereon, and comprising a downwardly and forwardly curved chute whereby the caps are discharged one at a time from said machine, in combination with means to paraffin both faces and the edge of each cap consisting of a pair of constantly driven paraffining rolls receiving said caps, said rolls formed of compressible absorbent material and normally pressed together and means for supplying paraffin to one of said rolls.

5. A machine for the manufacture of flat closing disks or caps, having means for delivering said disks horizontally into the bite of paraffin applying and idler rolls, comprising a paraffin pot provided with supporting means, a rotary horizontally arranged paraffin applying roll having a compressible absorbent working surface dipping into said pot below the normal liquid paraffin line thereof, a stripping roll arranged over said pot, means normally maintaining said stripping roll against and compressing said working surface, an idler rotary roll arranged above and parallel with and rotated by said paraffin applying roll and having a compressible absorbent working surface, means normally holding said applying and idler rollers together under pressure to compress the working surfaces thereof at the bite between said rollers, and means for rotating said applying roller.

6. A paraffin pot adapted to maintain a supply of liquid paraffin, means for supporting said pot, roller supports beside and independent of said pot, a rotary paraffin applying roller having a compressible working surface and carried by said supports, said roller being arranged horizontally above and dipping into said pot, stripping means for said roller, another compressible surface rotary applying roller carried by said supports above and parallel with said first mentioned roller, and means for holding said rollers together with the surfaces thereof compressed at the bite between the rollers.

7. In a mechanism for coating cover disks or caps, a pair of coöperating rotary applying or coating rollers between which said disks are passed, a liquid paraffin supply for said rollers, and means for holding said rollers together under pressure, each roller having a compressible absorbent working surface composed of a series of parallel fabric disks and means compressing the same together.

8. In a coating mechanism, a pair of rotary coöperating paraffin applying rolls, arranged one over the other and normally held pressed together compressing their working surfaces, whereby the lower roll distributes paraffin to the upper roll, means for supplying paraffin to the lower roll, each roll comprising a shaft, a series of parallel fabric disks removably and concentrically mounted thereon, and the outer edges of which form the compressible absorbent working surface of the roll, end heads arranged on said shaft and between which said disks are compressed, and means for regulating the pressure of said heads on the disks.

9. In a coating mechanism, a rotary paraffin applying roll, comprising a core, a series of fabric disks concentrically arranged thereon, a shaft on which said core is removably arranged, end heads removably arranged on the shaft and between which said disks are compressed, a stop for one head, a sleeve removably fixed on said shaft adjacent the other head, and a nut adjustable on said sleeve for controlling the pressure of said last mentioned head against said disks, substantially as described.

10. In a coating mechanism, supports, a removably mounted rotary shaft, a sleeve secured on said shaft, a removable head loose on said shaft and held against outward movement by said sleeve, another removable head loose on said shaft, an exteriorly threaded sleeve removably fixed on said shaft, a nut longitudinally adjustable on said sleeve to limit outward movement of said last mentioned head, a series of fabric disks arranged concentrically of said shaft between and compressed by said heads, the outer edges of said disks forming the compressible absorbent working surface of a paraffin applying roller, means for rotating said roller, and means for supplying liquid paraffin thereto.

11. In combination, a paraffin pot, means for supporting the same, a pair of vertically disposed brackets arranged on opposite sides of said pot, means for supporting said brackets, a paraffin applying roller arranged transversely across the top of the pot and having a compressible absorbent surface dipping thereinto, said roller having a shaft mounted in and carried by said brackets, means for driving said roller, an idler paraffin applying roller arranged above and parallel with said first mentioned roller and having a compressible absorbent working surface in compressing engagement with and supplied with paraffin from the working surface of said first mentioned roller, said idler roller being rotated by the engagement of said surfaces, adjustable journal boxes carried by said brackets, means for adjusting said boxes toward the axis of said first mentioned roller, the shaft of said idler roller being mounted in said boxes, a stripping roller arranged over said pot and in engagement with the upwardly moving portion of said first mentioned roller, said stripping roller being carried by said brackets and provided with means for varying the pressure thereof against the working face of said first mentioned roller.

12. In combination, mechanism for cutting out closing disks comprising a pedestal, a chute for receiving said disks and delivering them horizontally into the bite between paraffining rolls, a paraffin pot having a support, vertically disposed brackets secured to said pedestal and arranged on opposite sides of said pot, and a pair of coöperating rotary parallel rollers arranged one over the other above said pot and carried by said brackets, the lower roller dipping into said pot and supplying paraffin to the upper roller.

13. In combination, a paraffin pot, and a pair of coöperating rotary paraffin coating rollers supported independently of said pot and arranged above the same, and one over the other, the lower roller being positively driven and dipping into said pot and supplying paraffin therefrom to the upper roller, said upper roller being an idler and having a compressible paraffin-receiving and applying surface compressed against the paraffin applying surface of the lower roller, whereby said upper roller is driven by frictional contact with the lower roller.

14. In combination, a paraffin pot, a pair of coöperating parallel paraffin coating rollers arranged one over the other above said pot, the lower roller dipping into said pot and supplying paraffin to the upper roller, an open chute for delivering flat disks horizontally into the bite of said rollers, and an open discharge chute extending above said pot adapted to strip and receive said disks from the lower roller, whereby the operator can observe the articles passing down said chutes to and from said pair of rollers.

15. A machine for producing flat paraffined cover disks comprising a bed, a pedestal therefor, mechanism carried by said bed for cutting out said disks comprising a downwardly opening discharge through which said disks drop, a chute secured to said bed and arranged below said discharge to receive said disks, said chute extending downwardly and forwardly, a pair of horizontal paraffin coating coöperating rotary rollers arranged one over the other at the discharge end of said chute to receive the disks therefrom, supporting means for said rollers secured to said pedestal, means for supplying paraffin to said rollers, a discharge chute for receiving the disks from said rollers, and means for rotating said rollers.

16. A machine for producing flat closing disks, each having a handle tab secured thereto, comprising a vertically disposed bed having a forwardly projecting horizontal block with a vertical discharge opening therethrough, means for feeding a ribbon of disk stock with its flat faces horizontal along the front face of said bed and over the top face of said block, means at the front face of said bed for securing tabs on the top face of said stock while on said block, means for cutting disks from said stock and discharging the same down through said opening, and means for guiding the stock waste from the outer end of said block.

In testimony whereof I affix my signature, in presence of two witnesses.

WILBUR L. WRIGHT.

Witnesses:
H. S. REESIDE,
B. H. DEPENBROCH.